US006449551B1

(12) United States Patent
Wrede

(10) Patent No.: US 6,449,551 B1
(45) Date of Patent: Sep. 10, 2002

(54) ELECTRICALLY CONTROLLED BRAKING SYSTEM FOR A VEHICLE

(75) Inventor: Juergen Wrede, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/709,780

(22) Filed: Nov. 10, 2000

(30) Foreign Application Priority Data

Nov. 11, 1999 (DE) .......................... 199 54 284

(51) Int. Cl.⁷ .................... B60T 13/00; B60T 13/66; G06G 7/70
(52) U.S. Cl. .............. 701/70; 701/65; 701/66; 303/20
(58) Field of Search .............. 701/1, 70, 65, 701/66, 71, 72, 78, 79; 303/20, 7, 155, 124, 151; 192/222; 477/907, 92, 94; 74/411.5

(56) References Cited

U.S. PATENT DOCUMENTS

| | | | | |
|---|---|---|---|---|
| 5,184,875 A | * | 2/1993 | Wrede | 303/3 |
| 5,209,551 A | * | 5/1993 | Wood et al. | 303/7 |
| 5,582,275 A | * | 12/1996 | Arnold | 188/138 |
| 5,696,679 A | * | 12/1997 | Marshall et al. | 364/424.082 |
| 6,015,194 A | * | 1/2000 | Decker | 303/155 |
| 6,167,354 A | * | 12/2000 | Maleki et al. | 702/147 |
| 6,227,626 B1 | * | 5/2001 | Blattert | 303/20 |
| 6,236,927 B1 | * | 5/2001 | Sherman | 701/70 |

FOREIGN PATENT DOCUMENTS

| | | |
|---|---|---|
| DE | 196 34 567 | 3/1998 |
| DE | 196 48 581 | 5/1998 |
| DE | 197 52 543 | 6/1999 |
| GB | 2 338 274 | 12/1999 |
| WO | WO 99/48738 | 9/1999 |

* cited by examiner

Primary Examiner—Tan Nguyen
Assistant Examiner—Dalena Tran
(74) Attorney, Agent, or Firm—Kenyon & Kenyon

(57) ABSTRACT

An electrically controlled braking system for a vehicle is proposed, in which at least one actuating variable for the service brake and one actuating variable for a parking-brake request are received by a central control unit, the variables, or variables derived therefrom, being transmitted separately via a communication system to wheel modules actuating at least one wheel brake.

11 Claims, 4 Drawing Sheets

ELECTRICALLY CONTROLLED BRAKING SYSTEM FOR A VEHICLE

FIELD OF THE INVENTION

The present invention relates to an electrically controlled braking system for a vehicle.

BACKGROUND INFORMATION

Electrically controlled braking systems are known in varied form. For example, German Published Patent Application No. 196 34 567 describes an electrically controlled braking system with a decentralized structure, in which a first control module for forming reference variables dependent on the driver's input, and second control modules for controlling or regulating the actuators of the wheel brakes are interconnected via at least one communication system. The braking system described is intended to fulfill both a service-brake function and a parking-brake function. Measures with respect to this requirement cannot be gathered from the known related art.

An object of the present invention is to specify an electrical braking system in which, in addition to a service-brake function, a parking-brake function is implemented as well.

For example, the German Published Patent Application No. 197 52 543 describes a brake-adjusting device which is actuated for applying braking force to the wheel brake. In addition to this adjusting device, a preferably bistable electromagnetic brake is provided for fixing this control element in its respective brakes-applied mode. By driving this locking device, the application force applied by the final brake control element is maintained, even without driving the final brake control element. A parking-brake function can be implemented by this locking or arresting mechanism. No instructions are given for integrating such a control element into a decentralized control structure.

Furthermore, parking brakes are also known in conjunction with hydraulically and/or pneumatically operated disc brakes or drum brakes, in which the parking-brake action is provided by driving an electrically operable actuator (e.g., German Published Patent Application No. 196 48 581).

SUMMARY OF THE INVENTION

The separate transmission of service-brake control signals and parking-brake control signals, which are generated in one central control module on the basis of the corresponding actuating signals, via the communication system to the control modules actuating the wheel brakes provides a simple, well-managed, trouble-insusceptible integration of the service-brake function and the parking-brake function into one decentrally controlled electrical braking system.

It is particularly advantageous that no additional cabling expenditure is necessary even for actuating a final wheel-brake control element together with an arresting or locking device, since the control signals for both final control elements are supplied via the communication system which is present in any case. In contrast to single lines, the use of the communication system permits a fail-safe transmission for the parking-brake control signal.

It is also advantageous that the function of driving the parking-brake, arresting or locking device can be monitored by monitoring measures - known for themselves - of the electrical transmission line, from the adjusting-device control module controlling the respective wheel brake, and can be integrated into the control module.

DETAILED DESCRIPTION

Figure 1:
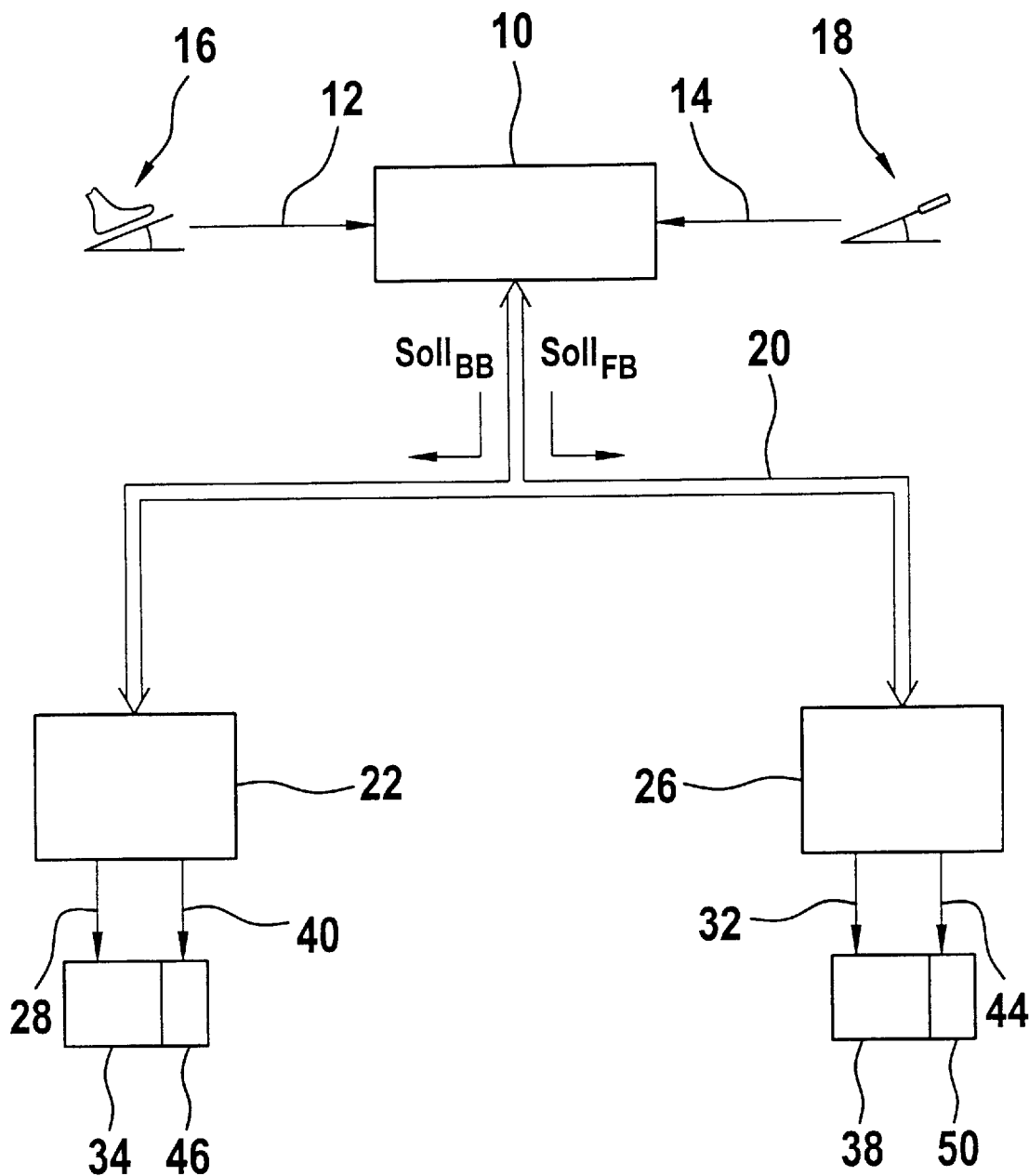
FIG. 1 shows a block diagram of an electrically controlled braking system, with whose aid the service brake and the parking brake are actuated.

Electrically controlled braking systems having decentralized electronics are increasingly used in modem motor vehicles. The individual brake actuators at the wheel brakes are controlled electrically, the application force being applied hydraulically, pneumatically or electromotively. FIG. 1 shows a synoptic block diagram of such a decentralized, electrically controlled braking system. A central control unit 10 is provided which, via input lines 12 and 14, receives one or more actuating signals from a service-brake request sensor 16 and one or more actuating signals from a parking-brake request sensor 18. Depending on the embodiment, the actuating signals are position signals, force signals, etc. The actuating signals are converted in control unit 10 into setpoint or controlled variables for the service brake and for the parking brake. The setpoint braking force, setpoint braking torque or setpoint braking pressure variables for the individual wheel brakes or axles are formed for the service brake on the basis of the at least one actuating signal from the service-brake request sensor 16, possibly taking into account further operating variables such as axle loads, etc., not shown. In corresponding manner, based on the at least one actuating variable from parking-brake request sensor 18, a corresponding setpoint variable or a controlled variable is formed for the parking brake. In one exemplary embodiment, this setpoint or controlled variable is a predefined triggering value for the service-brake actuators and a triggering command for the locking device, or only a defined triggering command for the parking-brake actuator, i.e. the locking or arresting device. The indicated setpoint or control values, SollBB and SollFB, are transmitted via communication system 20 to control units 22 through 26 which are used for controlling the individual wheel brakes. Control units 22 through 26 are connected via triggering lines 28 through 32 to actuators 34 through 38 which apply the application force of the wheel brakes within the framework of the service brake. In addition, control units 22 through 26 are connected via further triggering lines 40 through 44 to arresting or locking devices 46 through 50, or other parking-brake actuators which are allocated to the respective brake actuators 34 through 38 and which lock or arrest them in the prevailing position in response to triggering.

Each of control units 22 through 26 receives the service-brake setpoint value intended for it and the parking-brake setpoint value or control value intended for it. With respect to the service-brake setpoint value, it is regulated within the framework of a closed control loop, e.g. a pressure control loop, a braking-force control loop or a braking-torque control loop, taking into account the relevant feedback signal of the wheel brake. In one exemplary embodiment, control units 22 through 26 also receive the setpoint or controlled variables for the parking-brake function and actuate the arresting or locking device as a function of the controlled variable. In another exemplary embodiment, which is used in particular in conjunction with electromechanical brake actuators, a coordination is carried out in each control unit 22 through 26 between the existing setpoint braking requests (service-brake request or parking-brake request), and the greater of the two values in each case is set for adjusting the brake actuator, with subsequent locking by the locking or arresting device. In this manner, a service-brake function and a parking-brake function are provided.

Figure 2:
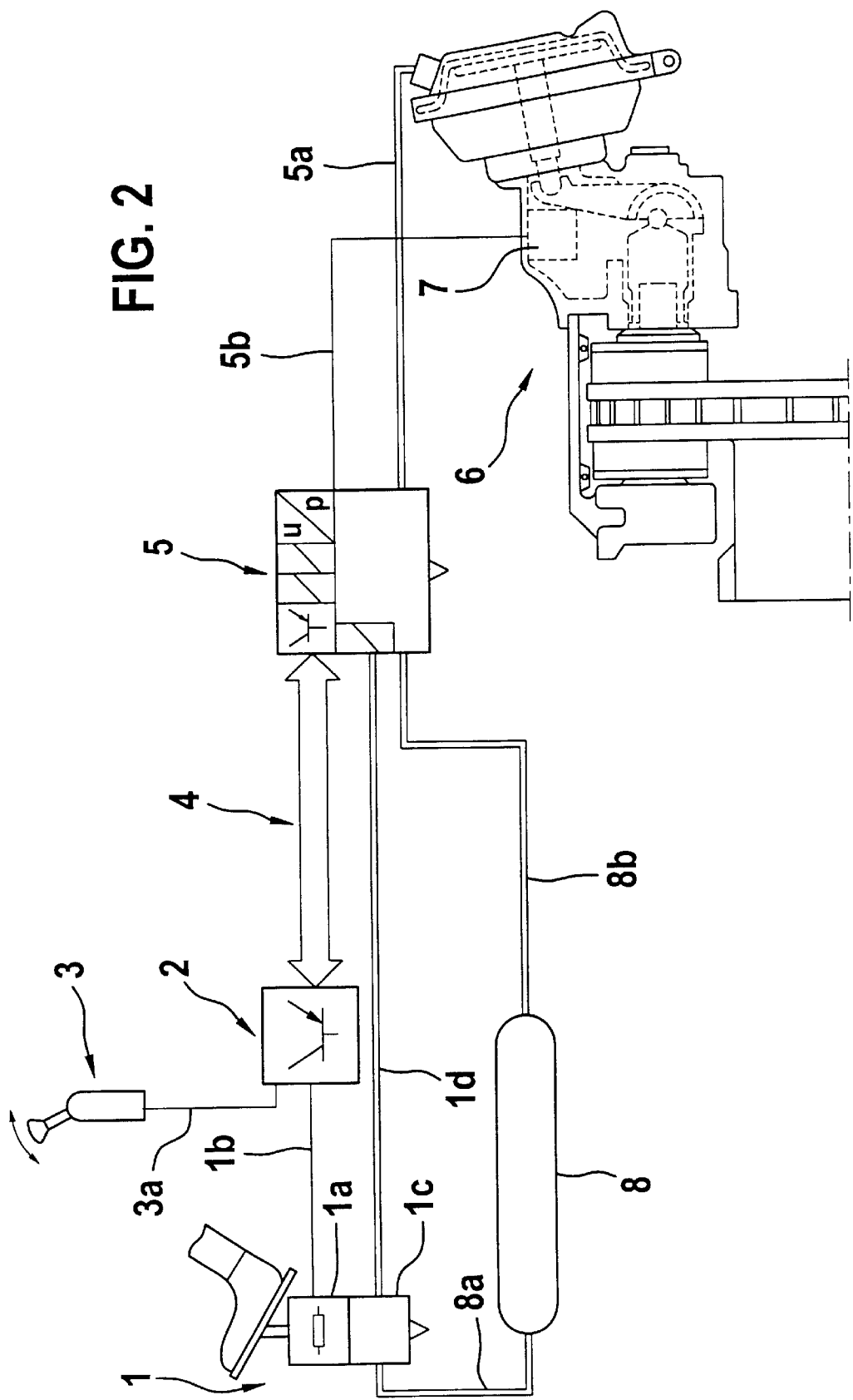
FIG. 2 shows a synoptic block diagram, using as an example a wheel brake for an electrically controlled, pneumatic braking system having service-brake and parking-brake function.

A pneumatic braking system represents another application example. This is shown in FIG. 2. Particularly in the case of heavy commercial vehicles having compressed-air braking systems, a strong trend can be seen away from the drum brake to the pneumatically operated disc brake. In this context, today the service-brake action is represented by a diaphragm-type cylinder, and the parking-brake action and sometimes the secondary-brake action are represented by combination cylinders composed of a diaphragm part and a spring-type brake actuator part. As mentioned in the introduction, there are technical design approaches which produce the parking-brake action, without a spring-type brake actuator, via an electrically controlled mechanism in the mechanical application of the disc brake. Furthermore, electronically controlled braking systems are known today. They include an electrical actuator for the service brake (service-brake module 1, a central control unit 2 and so-called pressure-control modules 5). They are connected to the central control unit by way of a data bus such as a CAN data bus 4 via which they exchange data. Pressure-control modules 5 are disposed near wheel brake 6. The wheel brake, shown only symbolically in FIG. 2, is provided with one of the arresting mechanisms 7 mentioned. In addition, the braking system is provided with a parking-brake valve 3.

Running from electrical part 1*a* of service-brake module 1 to control unit 2 is an electric line 1*b* via which an actuating variable of the service-brake module is transmitted. Correspondingly, running from parking-brake valve 3 to control unit 2 is a line 3*a* via which at least one actuating variable of the parking-brake valve is likewise transmitted. A pneumatic control line 1*d* runs from pneumatic part 1*c* of service-brake valve 1 to pressure-control module 5. Also provided is a compressed-air reservoir 8 which is connected via pneumatic pressure lines 8*a* to pneumatic part 1*c* of the service-brake valve and via line 8*b* to pressure-control module 5. In addition, the brake cylinder of disc brake 6 is actuated pneumatically via a pneumatic pressure line 5*a*. Starting from pressure-control module 5 is also an electric line 5*b* via which arresting mechanism 7 provided in the disk brake is actuated.

The electrical actuating signal of parking-brake valve 3 is conducted to the electronic control unit for the braking system. There, the actuating signal of the parking-brake valve is monitored and processed in known manner, for example, is subjected to a signal-range check, etc. In the case of two signals, a mutual comparison is made, etc. The actuating signals derived therefrom for arresting the individual wheel brakes are then sent by this control unit via existing data bus 4 to pressure-control modules 5 of the individual wheel brakes, of which only one is shown in FIG. 2. Each of these pressure-control modules contains at least one computer element which, on the basis of the arriving signals, switches an electrical operating device, e.g., an electrical driver stage, for actuating the arresting device. This driver stage is designed in such a way that errors in transmission to the arresting device, thus, for example, electrical interruptions or short circuits, are signaled to the computer element in pressure-control module 5 (for example, on the basis of current and/or voltage measurements). This allows reliable monitoring of the parking-brake actuation. In the case of the service brake, on the basis of the at least one actuating variable of the service-brake module, setpoint pressure variables are determined in control unit 2, are transmitted to pressure-control modules 5, and there, within the framework of the pressure-control loops provided, are set in known manner at the individual wheel brakes by appropriate driving of the valves contained in pressure-control modules 5.

In summary, it can be stated that, in the case of an electro-pneumatic braking system, the electrical parking-brake signal is transmitted via a central control unit and a data bus to pressure modulators near the wheels. From there, the electrical arresting device for the parking brake, integrated into the disc brake, is driven. In this context, in addition to the service-brake setpoint value, a separate parking-brake setpoint value or parking-brake command for the arresting is transmitted to the wheel modules. Particularly in the case of pneumatic braking systems, the normal brake cylinder cannot be used for the parking brake, since in the event that compressed air escapes, no braking action is ensured. Therefore, the parking-brake action is provided via a separate, electrically operable arresting device which guarantees maintenance of the parking-brake action, even if compressed air is lost.

Thus, in the electropneumatic braking system shown in FIG. 2, the service-brake request and parking-brake request are ascertained in central control unit 2 and transmitted via communication system 4 to individual wheel modules 5. They actuate the respective allocated wheel brake or wheel brakes according to the existing service-brake request, and actuate arresting device 7 preventing the movement of the wheel in response to the presence of a parking-brake request. The actuation of the arresting device is monitored by hardware monitoring measures, installed in respective wheel modules 5, which detect an electrical interruption or a short-circuit of transmission line 5*b* by evaluating, for example, the potential on the output line. Corresponding design approaches are also provided in connection with electromotive and/or electrohydraulic wheel brakes.

In another exemplary embodiment, particularly in connection with electromotive and/or electrohydraulic wheel brakes, as mentioned at the outset, both the service-brake setpoint values and the parking-brake setpoint values are determined for selected wheel brakes, are transmitted separately from one another by the central control unit to the respective wheel modules, there the setpoint values allocated to the wheel modules are coordinated and the resulting braking setpoint value is set by adjusting the wheel brake, possibly in conjunction with the arresting or locking device. In this context, in one exemplary embodiment, a parking-brake request is ascertained only for one part of the wheel brakes (for example, only for the rear axles).

Figure 3:
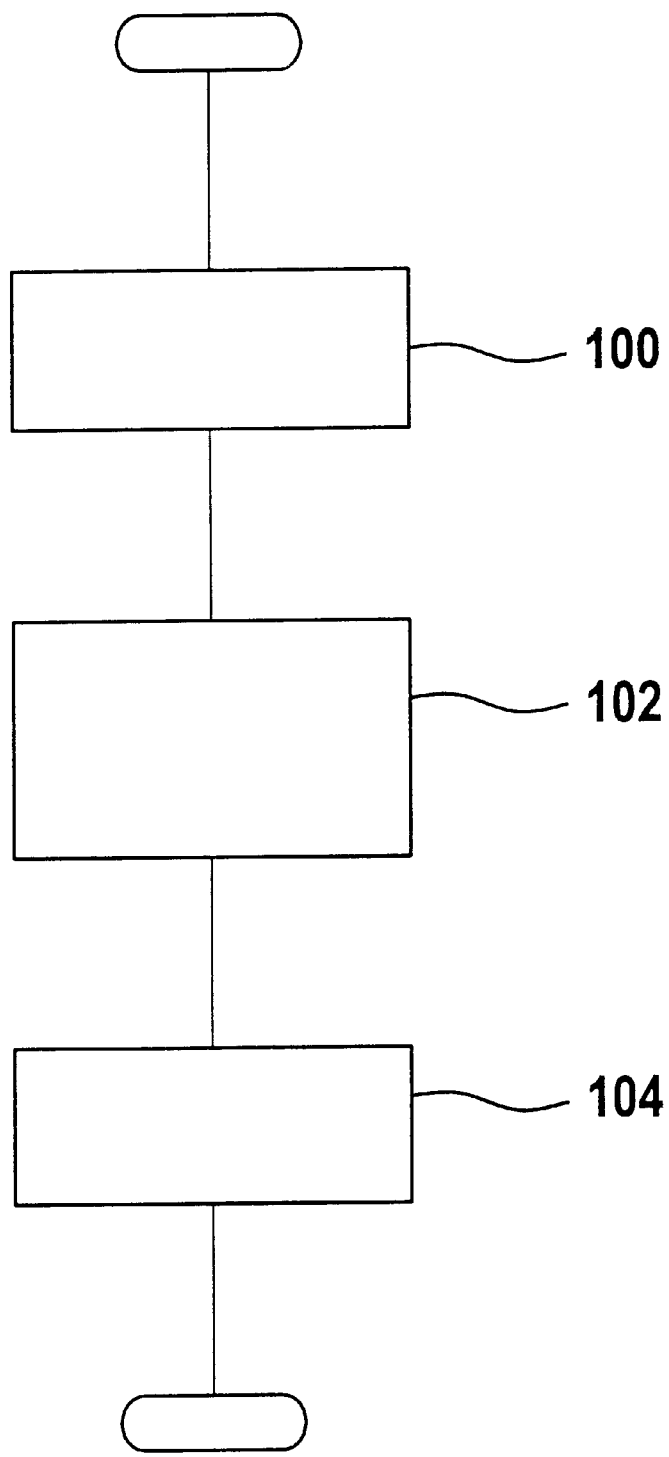
FIG. 3 shows a flow chart which represents a program of computer elements, with whose aid the service-brake function and the parking-brake function are implemented.
Figure 4:
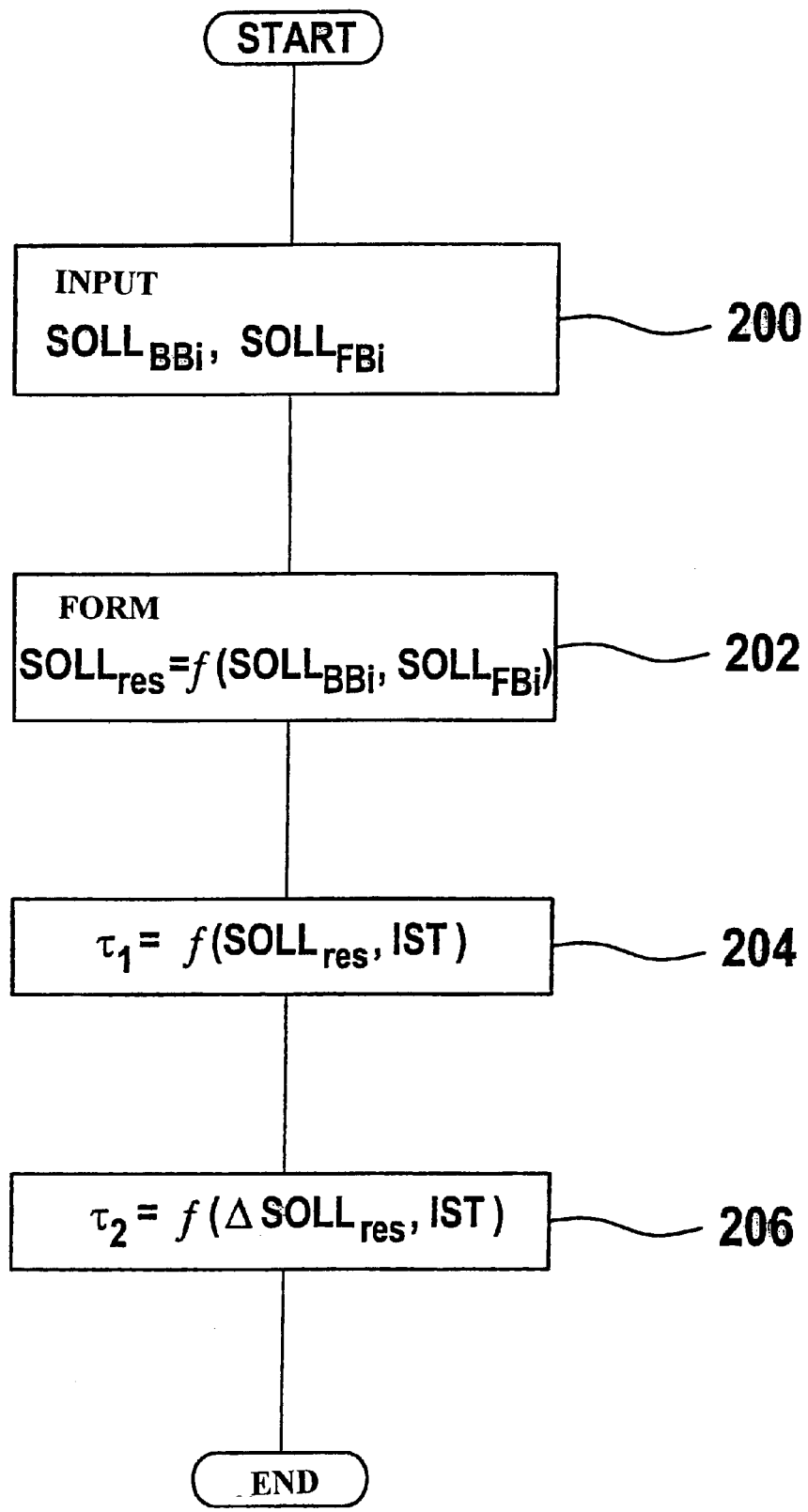
FIG. 4 shows another flow chart which represents a program of computer elements, with whose aid the service-brake function and the parking-brake function are implemented.

Such a design approach is shown with reference to the flow charts in FIGS. 3 and 4. They show a preferred implementation of the procedure described above, also in conjunction with the exemplary embodiment described with reference to FIG. 2 or an embodiment in which the parking-brake request merely represents control information for the arresting by the arresting device.

FIG. 3 sketches the program running in the central control unit. This program is run through at predefined points of time. In first step 100, the at least one actuating variable of the brake pedal βbb and the at least one actuating variable of the parking-brake pedal βfb are input. If there is a plurality of actuating variables, then a resulting actuating variable is determined from the plurality of actuating variables, for example, within the framework of a mean-value generation, maximum-value generation, etc. In the following step 102, the optionally wheel-individual or axle-individual setpoint values for the service-brake request Sollbbi and for the parking-brake request Sollfbi are formed on the basis of the input or calculated actuating variables and possibly further operating quantities such as axle loads, etc. In the following step 104, the respective setpoint variables are supplied separately from one another via the communication system to the wheel modules. Thereupon, the program is ended and is run through again at the next point of time.

The further processing of the transmitted setpoint values in the wheel modules is depicted in FIG. 4, using one wheel module as an example. The program sketched there is also run through at predefined points of time. In first step 200, the transmitted setpoint values for the service-brake request Sollbbi and for the parking-brake request Sollfbi are input. Thereupon, in step 202, the resulting setpoint value Sollres is formed as a function of the two transmitted setpoint values, for example, within the framework of a maximum-value selection, a mean-value generation, etc. In the following step 204, the triggering signal τ for the brake actuator is then formed on the basis of the resulting setpoint value, and on the basis of an actual value (current, pressure, braking torque, braking force, etc.) characterizing the brake actuation. This triggering-signal variable is output to the brake actuator. In the following step 210, on the basis, for example, of the system deviation, i.e. the deviation between the setpoint value and the actual value for the brake adjustment, it is determined whether adjustments are still being carried out at the actuator for setting the setpoint request. If the system deviation is within a predefined tolerance range and/or if its change is less than a predefined value, then it is assumed that no adjustments whatsoever are being carried out any longer at the brake actuator, so that according to step 206, a triggering variable τ2 for the locking or arresting device of the brake actuator is output. The program is thereupon ended, and is run through again at the next point of time.

The procedure described above, in which the service-brake request and the parking-brake request are transmitted separately from one another from a central control unit to one or more wheel modules actuating wheel brakes, can be used with the advantages indicated in conjunction with electromotive, electrohydraulic or electropneumatic systems, as well as in conjunction with combined systems, for example, in systems having electromotive rear-wheel brakes and electrohydraulic front-wheel brakes.

What is claimed is:

1. An electrically controlled braking system for a vehicle, comprising:
   an arrangement for determining at least one actuating variable for a service-brake request of a driver and at least one actuating variable for a parking-brake request of the driver;
   a central control unit for receiving the at least one actuating variable for the service-brake request of the driver and the at least one actuating variable for the parking-brake request of the driver; and
   an arrangement for performing one of the following:
      separately transmitting from the central control unit to at least one wheel module allocated to at least one wheel brake the at least one actuating variable for the service-brake request and the at least one actuating variable for the parking-brake request, and
      separately transmitting from the central control unit to the at least one wheel module allocated to the at least one wheel brake a variable derived from the at least one actuating variable for the service-brake request and a variable derived from the at least one actuating variable for the parking-brake request.

2. The braking system according to claim 1, wherein:
   service-brake setpoint values for the at least one wheel brake are ascertained in the central control unit on the basis of at least one of the at least one actuating variable for the service-brake request and the at least one actuating variable for the parking-brake request, and
   the service-brake setpoint values are transmitted to the at least one wheel module via a communication system.

3. The braking system according to claim 1, wherein:
   the at least one actuating variable for the parking-brake request is transmitted as a controlled-variable value for one of an arresting device and a locking device from the central control unit to the at least one wheel module.

4. The braking system according to claim 1, wherein:
   a parking-brake setpoint value is determined in the central control unit from the at least one actuating variable for the parking-brake request, and
   the parking-brake setpoint is transmitted to the at least one wheel module.

5. The braking system according to claim 1, wherein:
   a service-brake setpoint value is transmitted to each wheel-brake module, and
   the parking-brake request is transmitted to selected ones of the at least one wheel module.

6. The braking system according to claim 5, wherein:
   the selected ones of the at least one wheel module are associated with rear-axle brakes.

7. The braking system according to claim 1, wherein:
   the at least one wheel brake is actuated according to one of a pneumatic operation, a hydraulic operation, and an electromotive operation.

8. The braking system according to claim 1, wherein:
   a parking brake corresponds to an arresting device integrated into one of a disc brake and a drum brake.

9. The braking system according to claim 8, further comprising:
   an electric triggering line for supplying a parking-brake controlled variable to the arresting device, a respective one of the at least one wheel module communicating a reliability performance of an electrical transmission via a hardware monitoring.

10. The braking system according to claim 1, wherein:
    a resulting setpoint value is formed in the at least one wheel module from a service-brake setpoint value and a parking-brake setpoint value,
    the resulting setpoint value is set via a closed control loop, and
    a locking device is activated in response to a termination of actuator adjustments.

11. The braking system according to claim 1, wherein:
    the at least one wheel module corresponds to at least one pressure-control module of a pneumatically actuated disc brake.

* * * * *